(12) United States Patent
Forster

(10) Patent No.: US 10,599,895 B2
(45) Date of Patent: Mar. 24, 2020

(54) PREDICTIVE ANALYSIS OF DATA FROM MULTIPLE TEST SCENARIOS TO IMPROVE READ ACCURACY

(71) Applicant: AVERY DENNISON RETAIL INFORMATION SERVICES, LLC, Mentor, OH (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 16/169,138

(22) Filed: Oct. 24, 2018

(65) Prior Publication Data

US 2019/0122016 A1  Apr. 25, 2019

Related U.S. Application Data

(60) Provisional application No. 62/576,175, filed on Oct. 24, 2017.

(51) Int. Cl.
*G06F 19/00* (2018.01)
*G06K 7/10* (2006.01)
(Continued)

(52) U.S. Cl.
CPC ..... *G06K 7/10475* (2013.01); *G06K 7/10099* (2013.01); *G06K 7/10435* (2013.01);
(Continued)

(58) Field of Classification Search
CPC ....... G06Q 10/087; G06Q 10/08; G06Q 10/06
(Continued)

(56) References Cited

U.S. PATENT DOCUMENTS 6,707,381 B1 * 3/2004 Maloney ............ G07C 9/00103
340/568.1
7,830,262 B1 11/2010 Diorio et al.
(Continued)

OTHER PUBLICATIONS

International Search Report and Written Opinion of ISA/EPO prepared for PCT/US2018/057237 dated Jan. 18, 2019.
(Continued)

*Primary Examiner* — Ahshik Kim
(74) *Attorney, Agent, or Firm* — Avery Dennison Retail Information Services, LLC

(57) ABSTRACT

Inventory management systems and methods are provided for various applications. Such systems include a first RFID reader system having an RFID reader and a host. The RFID reader attempts to communicate with a plurality of RFID-readable tags, while the host is programmed to receive data from the RFID reader, which relates to the RFID-readable tags with which the RFID reader has successfully communicated. The host generates instructions based at least in part on the data and transmits the instructions to the host of a second RFID reader system. The host of the second RFID reader system modifies the operation of an associated RFID reader as it attempts to communicate with the plurality of RFID-readable tags, with the modification being based at least in part on the instructions received from the host of the first system and improving the performance of the RFID reader of the second system.

16 Claims, 3 Drawing Sheets

(51) Int. Cl.
*H04W 4/35* (2018.01)
*G07F 7/08* (2006.01)
*G06Q 10/08* (2012.01)
*G07F 7/10* (2006.01)

(52) U.S. Cl.
CPC ........... *G06Q 10/08* (2013.01); *G06Q 10/087* (2013.01); *G07F 7/0873* (2013.01); *G07F 7/1008* (2013.01); *H04W 4/35* (2018.02)

(58) Field of Classification Search
USPC ........................................................ 235/385
See application file for complete search history.

(56) References Cited

U.S. PATENT DOCUMENTS

| | | | |
|---|---|---|---|
| 8,020,768 B2* | 9/2011 | Ramos-Elizondo | ........................ G06Q 10/087 235/385 |
| 9,324,051 B2* | 4/2016 | D'Ambrosio | ........ G06Q 10/087 |
| 2006/0022815 A1 | 2/2006 | Fischer et al. | |
| 2008/0024275 A1* | 1/2008 | Quan | ................... G06K 7/0008 340/10.1 |
| 2008/0079564 A1 | 4/2008 | Shafer et al. | |
| 2008/0129485 A1* | 6/2008 | Tuttle | ................... G06K 7/0008 340/539.11 |
| 2010/0109851 A1* | 5/2010 | Burbridge | .............. G06Q 10/08 340/10.42 |
| 2010/0164687 A1* | 7/2010 | Perng | ................... G06K 7/0008 340/10.1 |
| 2010/0201520 A1 | 8/2010 | Stern et al. | |
| 2011/0266342 A1 | 11/2011 | Forster | |
| 2012/0161967 A1 | 6/2012 | Stern | |
| 2014/0266621 A1 | 9/2014 | Jones et al. | |

OTHER PUBLICATIONS

Wikipedia: "Answer to reset", Dec. 21, 2016 (Dec. 21, 2016) XP055539182, Retrieved from the Internet: URL:https://en.wikipdeia.org/w/index.php?ttitle-Answer_to_reset&oldid=755957398[retrieved on Jan. 8, 2019] p. 1-p. 2.

* cited by examiner

PREDICTIVE ANALYSIS OF DATA FROM MULTIPLE TEST SCENARIOS TO IMPROVE READ ACCURACY

CROSS REFERENCE TO RELATED APPLICATION(S)

The present application claims priority to and the benefit of U.S. provisional utility patent Application No. 62/576,175 filed on Oct. 24, 2017, which is incorporated herein by reference in its entirety.

BACKGROUND

Field of the Disclosure

The present subject matter relates to inventory management systems and methods based on radio frequency identification ("RFID") technology. More particularly, the present subject matter relates to the use of a first RFID reader system to improve the performance of a second RFID reader system.

Description of Related Art

It is known to employ RFID technology in an area (for example within a store or other retail environment) for various purposes. In one example, an RFID reader is associated with a point-of-sale location or check-out counter of a store and detects a tag associated with an item being purchased to register the price of the item. In another example, an RFID-readable tag or transponder is attached to each piece of merchandise in a store or storage area. The tags are scanned using an RFID reader to keep proper count of the product inventory. In yet another example, RFID technology is used as a security measure. In a typical RFID-based security system for a store, one or more RFID readers are installed adjacent to an exit, while guard tags are associated with (often by means of a hangtag or label) individual items sold in the store. When a customer purchases an item, the cashier will either remove or otherwise deactivate the guard tag associated therewith. If the guard tag has not been removed or deactivated (for example if a customer attempts to remove the item from the store without paying for it), the RFID reader or readers in the read field will sense the guard tag as the customer is exiting the store. Upon sensing the guard tag, the read field causes an alarm or other alert to trigger, thereby alerting store personnel to possible theft of the item.

Although the above-described systems are widespread and useful for tracking inventory and alerting store personnel to theft, there are situations in which it may be difficult for an RFID reader to communicate with all of the RFID-readable tags in its range. The inability to communicate with a particular RFID-readable tag may be a product of any of a number of factors, including the characteristics of the RFID-readable tag itself and the other RFID-readable tags in the range of the RFID reader, the proximity of the RFID-readable tags to each other, the environment monitored by the RFID reader, and the dielectric and metallic properties of the inventory with which the RFID-readable tags are associated. Accordingly, it would be advantageous to provide an inventory management system with an RFID reader that is more capable of communicating with all of the RFID tags in its range.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an inventory management system includes a first RFID reader system having an RFID reader configured to attempt to communicate with a plurality of RFID-readable tags and generate data regarding the RFID-readable tags with which the RFID reader has successfully communicated. A host of the first RFID reader system is programmed to receive the data from the RFID reader, generate instructions based at least in part on the data, and transmit the instructions. The instructions are received by a host of a second RFID reader system, which uses the instructions to modify the operation of an RFID reader of the second RFID reader system as it attempts to communicate with the plurality of RFID-readable tags. The modification to the operation of the RFID reader of the second RFID reader system is intended to improve its operation, such as by allowing it to communicate with a greater number of RFID-readable tags in a given time.

In another aspect, a method is provided for managing inventory. The method includes providing a plurality of RFID-readable tags and operating a first RFID reader to attempt to communicate with the plurality of RFID-readable tags. Data is generated regarding the RFID-readable tags that have been successfully communicated with by the first RFID reader, with instructions being generated based at least in part on the data. A second RFID reader is operated to attempt to communicate with the plurality of RFID-readable tags, with the operation of the second RFID reader in attempting to communicate with the plurality of RFID-readable tags being modified based at least in part on the instructions.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
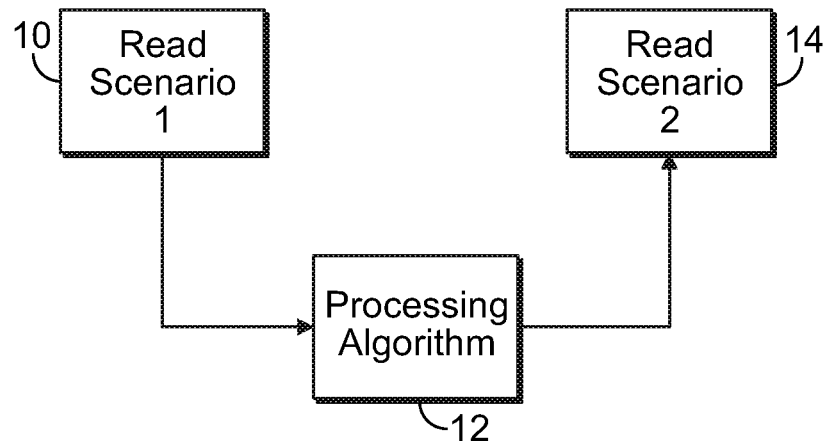
FIG. 1 is a schematic diagram of a method carried out by an inventory management system according to an aspect of the present disclosure.

FIG. 1 illustrates the actions carried out by an inventory management system according to the present disclosure to improve the performance of an RFID reader. The inventory management system carrying out the actions of FIG. 1 includes first (or upstream) and second (or downstream) RFID reader systems, each including a host and an RFID reader, but it is within the scope of the present disclosure for an inventory management system to include more than two RFID reader systems. Each RFID reader attempts to communicate with a plurality of RFID-readable tags (e.g., product tags each associated with a different piece of merchandise and containing information regarding the associated piece of merchandise, such as its SKU and/or price or other information) by emitting an RF signal into an environment and receiving return RF signals from RFID-readable tags in the environment. The environments monitored by the two RFID reader systems are different (although the environments may be identically configured) and the RFID readers may attempt to communicate with the RFID-readable tags at different times.

The hosts of the two RFID reader systems may be identical or differently configured, and may be provided according to either novel or conventional design. In one exemplary embodiment, the hosts are programmable computers, but the hosts may be otherwise configured, provided that each is capable of communicating with the associated RFID reader(s) and with at least one of the other hosts of the inventory management system. Each host is preferably programmed to receive data from the associated RFID reader (with the data relating to the RFID-readable tags with which the associated RFID reader was able to successfully communicate), to provide commands to the associated RFID reader to direct its operation, and to send instructions to and/or receive from the other host(s), although it is within the scope of the present disclosure for a host to include additional functionality.

In the scenario of FIG. 1, the first RFID reader system attempts to communicate with a plurality of RFID-readable tags, as indicated at 10 as "Read Scenario 1." Typically, the first RFID reader system monitors an environment in which the RFID-readable tags are readily communicated with, such that the RFID reader of the first RFID reader system will typically be successful in communicating with all of the RFID-readable tags. For example, the environment monitored by the first RFID reader system may be a location of a production facility in which the RFID-readable tags are manufactured and/or mounted to their associated merchandise, such as the first RFID reader system comprising a tunnel reader, which communicates with a plurality of RFID-readable tags contained in a box or other receptacle on a conveyor.

The RFID reader generates data regarding the RFID-readable tags with which it has successfully communicated (ideally, all of the RFID-readable tags) and transmits that data to the associated host. The host of the first RFID reader system employs a processing algorithm to generate instructions based at least in part on the data from the first RFID reader, as indicated in FIG. 1 at 12 as "Processing Algorithm." The instructions generated by the first host are transmitted to the host of the second RFID reader system, which receives them and uses the instructions to modify the operation of the associated RFID reader, with the monitoring carried out by the second RFID reader system identified in FIG. 1 at 14 as "Read Scenario 2." In one embodiment, between "Read Scenario 1" and "Read Scenario 2," the RFID-readable tags that were monitored by the first RFID reader system have been moved from the environment monitored by the first RFID reader system to the environment monitored by the second RFID reader system. Thus, the same RFID-readable tags are monitored by both RFID reader systems. In another embodiment, the second RFID reader system is instead tasked with monitoring different RFID-readable tags, which may be of the same type as those monitored by the first RFID reader system.

The second RFID reader system monitors an environment in which the RFID-readable tags are less easily communicated with than in the environment monitored by the first RFID reader. For example, the environment monitored by the second RFID reader system may be a store showroom or similar location in which merchandise associated with the RFID-readable tags is displayed for customer consideration and purchase. Thus, while the same or similar RFID-readable tags may be monitored in both environments, some aspect of the second environment (which may be a characteristic of the environment itself, the configuration of the second RFID reader system, the dielectric and metallic properties of the items associated with the RFID-readable tags, and/or the manner in which the RFID-readable tags are dispersed throughout the environment, for example) makes it more difficult for the second RFID reader system to successfully communicate with all of the RFID-readable tags. The instructions generated by the first host and transmitted to the second host are, thus, intended to improve the monitoring performed by the second RFID reader system. In particular, the first host provides the second host with instructions that are intended to allow the second RFID reader to successfully communicate with more of the RFID-readable tags than if the second RFID reader were to operate in the absence of the instructions. The first host, thus, in formulating the instructions, may identify specific RFID-readable tags that may be difficult for the second RFID reader to communicate with and includes in the instructions specific actions to be carried out by the second RFID reader to increase the likelihood of communicating with such hard-to-read RFID-readable tags and/or information that may be acted upon by the second host to modify the operation of the second RFID reader to include specific actions that will increase the likelihood of communicating with such RFID-readable tags.

The instructions generated by the first host may, thus, be dependent on the nature of a diagnosed or predicted difficulty in communicating with particular RFID-readable tags. For example, the first host may associate each RFID-readable tag with a range of characteristics, such as backscatter, point in space it reads, number of reads, frequency of reads, etc. One or more of these characteristics, when factored into the generation of the instructions, causes the second RFID reader to change its approach to attempting to communicate with a specific, hard-to-read RFID-readable tag, such as by modifying the signal sent to such an RFID-readable tag and/or increasing the number of times that the second RFID reader attempts to communicate with that RFID-readable tag. The inventory management system thus achieves the goal of increasing the number of RFID-readable tags (and, in a particular example, hard-to-read RFID readable tags) that are successfully communicated with in "Read Scenario 2."

While increasing the number of RFID-readable tags that have been successfully communicated will be a typical goal of an inventory management system according to the present disclosure, it should be understood that the operation of the second RFID reader may be modified so as to achieve any other goal. For example, for an RFID reader system in "Read Scenario 2" that has spatial discrimination, the operation of the second RFID reader may be modified so as to increase the read in a given area.

Figure 2:
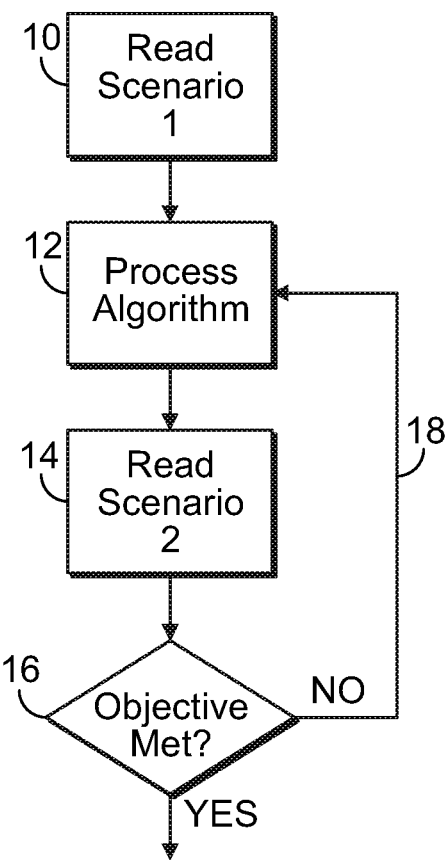
FIG. 2 is a schematic diagram of a modified version of the method and system of FIG. 1.

It should be understood that FIG. 1 illustrates the most basic version of an inventory management system and method according to the present disclosure, as any of a number of modifications may be made for improved and/or additional functionality. For example, FIG. 2 illustrates what may be referred to as an adaptive system/method, in contrast to the system/method of FIG. 1, which is not an adaptive system/method. In FIG. 2, feedback from the second RFID reader system is used to modify subsequent instructions generated by the first host, such that a subsequent attempt by the second RFID reader to communicate with the RFID-readable tags (using modified instructions from the first host) will tend to increase the number of RFID-readable tags successfully communicated with by the second RFID reader.

In particular, the second host is programmed to assess the operation of the second RFID reader in attempting to communicate with the RFID-readable tags. The second host considers whether the second RFID reader has successfully communicated with all of the RFID-readable tags by comparing the RFID-readable tags identified by the second RFID reader to the RFID-readable tags identified by the first RFID reader, as indicated at 16 in FIG. 2 as "Objective Met?" If the second host finds that the second RFID reader has successfully communicated with all of the RFID-readable tags, then it may allow the second RFID reader to continue operation pursuant to the initial or most recent instructions transmitted to the second host from the first host. On the other hand, if the second host finds that the second RFID reader has not successfully communicated with all of the RFID-readable tags, then the second host may generate and transmit second data to the first host, which is indicated at 18 in FIG. 2.

The first host then generates and transmits subsequent instructions to the second host, with the subsequent instructions being based at least in part on the second data and further modifying the operation of the second RFID reader to further improve its performance in subsequent attempts to communicate with RFID-readable tags (which may be either the same RFID-readable tags monitored initially or different RFID-readable tags). Alternatively, rather than the first host generating the subsequent instructions, it is also within the scope of the present disclosure for the second host itself to modify the initial or the latest instructions from the first host using the second data to generate the subsequent instructions that further modify the operation of the second RFID reader. A modification to the instructions transmitted to the second RFID reader that is implemented by the second host may be referred to as a "genetic" test, as the second host operates to improve the function of the second RFID reader system without consulting the first host.

Figure 3:
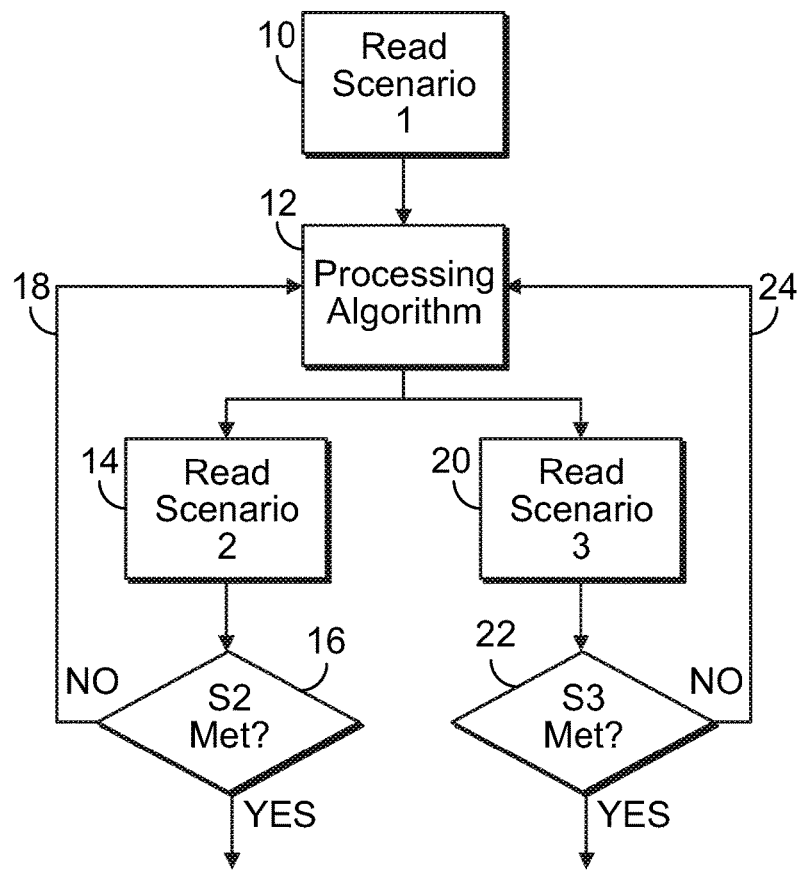
FIG. 3 is a schematic diagram of a modified version of the method and system of FIG. 2.

FIG. 3 illustrates a variation of the system/method of FIG. 2. In the system of FIG. 3, the first host generates and transmits instructions to a second host, with the second host assessing the performance of the second RFID reader and generating second data that is used to generate subsequent instructions, as in FIG. 2. In addition to transmitting instructions to the second host, the instructions are also transmitted to a third host, which is part of a third RFID reader system, along with an associated third RFID reader. The third host and third RFID reader may be configured in accordance with the foregoing description of hosts and RFID readers of the present disclosure. The second and third RFID reader systems may be identical or differently configured, along with the environments monitored by the second and third RFID reader systems being either identical or differently configured.

The third RFID reader system operates in accordance with the preceding description of the system/method of FIG. 2, with the third host receiving the instructions and modifying the operation of the third RFID reader based at least in part on the instructions, as indicated in FIG. 3 at 20 as "Read Scenario 3." The third RFID reader attempts to communicate with the RFID-readable tags present in its environment, and the third host assesses the operation of the third RFID reader in attempting to communicate with the RFID-readable tags, as indicated in FIG. 3 at 22 as "S3 Met?" If the third host finds that the third RFID reader has successfully communicated with all of the RFID-readable tags, then it may allow the third RFID reader to continue operation pursuant to the initial or most recent instructions transmitted to the third host from the first host. On the other hand, if the third host finds that the third RFID reader has not successfully communicated with all of the RFID-readable tags, then the third host may generate and transmit third data to the first host, as indicated at 24.

The first host then generates and transmits subsequent instructions to the second and/or third hosts, with the subsequent instructions being based at least in part on the second data (if received from the second host) and/or the third data (if received from the third host) further modifying the operation of the second and/or third RFID readers to further improve their performance in subsequent attempts to communicate with RFID-readable tags. While the first host may receive data from the second and third hosts, subsequent instructions generated by the first host may give more weight to the data from one of the downstream hosts than the other. For example, if monitoring of the second environment is more important to the operator of the inventory management system than monitoring of the third environment, then the first host may be programmed to give more weight to the feedback (i.e., the second data) received from the second host than to the feedback (i.e., the third data) received from the third host in generating the subsequent instructions. Further, while FIG. 3 illustrates two RFID reader systems receiving instructions from a first RFID reader system, it should be understood that more than two downstream RFID reader systems may receive instructions from an upstream RFID reader system, with the hosts of each of the downstream RFID reader systems providing feedback data to the host of the upstream RFID reader system, as appropriate.

Figure 4:
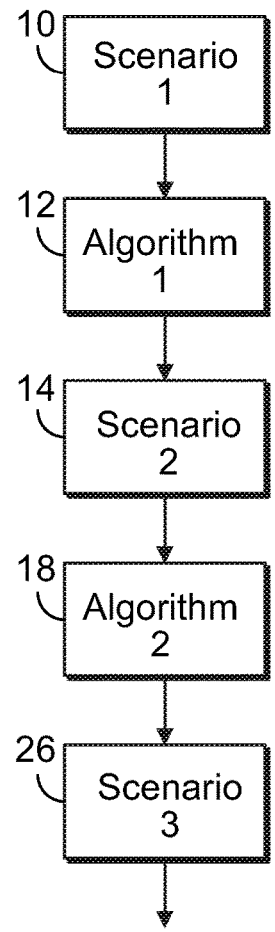
FIG. 4 is a schematic diagram of another embodiment of a method carried out by an inventory management system according to an aspect of the present disclosure.

While FIG. 3 illustrates a pair of downstream RFID reader systems receiving the same instructions and operating in parallel or simultaneously, it is within the scope of the present disclosure for two downstream RFID reader systems to receive different instructions and/or operate sequentially, as in FIG. 4. In the system/method of FIG. 4, first and second RFID reader systems operate generally in accordance with the system/method of FIG. 2. However, rather than the subsequent instructions being transmitted to the second host, the subsequent instructions are instead transmitted to a third host of an RFID reader system, which may be configured in accordance with the foregoing description of hosts and RFID readers of the present disclosure. The second and third RFID reader systems may be identical or differently configured, along with the environments monitored by the second and third RFID reader systems being either identical or differently configured.

The third RFID reader system operates in accordance with the preceding description of the second RFID reader system of FIG. 1, with the third host receiving the subsequent instructions and modifying the operation of the third RFID reader based at least in part on the instructions, as indicated in FIG. 4 at 26 as "Scenario 3." While FIG. 3 shows only two downstream RFID reader systems receiving different instructions from the first host and (optionally) operating sequentially, it should be understood that an inventory management system/method may include more than two downstream RFID reader systems receiving different instructions from the first host and (optionally) operating sequentially. For example, the third host may be programmed to assess the operation of the third RFID reader and transmit third data to the first host. The first host may then generate further instructions based at least in part on the third data and transmit the further instructions (which may be different from the instructions sent to the hosts of the other downstream RFID reader systems) to the host of a fourth RFID reader system, which may be configured similarly to any of the downstream RFID reader systems described herein. The host of the fourth RFID reader system modifies the operation of an associated fourth RFID reader based at least in part on the further instructions, optionally providing feedback to the first host for generating additional instructions for a fifth host, and so forth.

Figure 5:
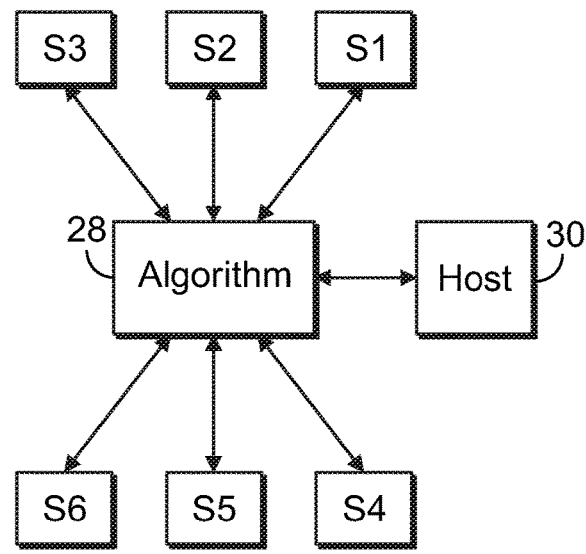
FIG. 5 is a schematic diagram of an exemplary exchange of data and instructions carried out by an inventory management system according to the present disclosure.

As noted above, the first host may receive data from any of a number of hosts of downstream RFID reader systems in generating instructions for one or more of the downstream RFID reader systems. FIG. 5 illustrates such an arrangement, in which the algorithm 28 implemented by the first host 30 to generate instructions receives, as input, data from a number of sources S1, S2, S3, S4, S5, and S6, some or all of which may be the hosts of downstream RFID reader systems or some or all of which may be data sources of some other nature. Exemplary data sources include production test systems, printer encode systems, tunnel read systems, portal read systems, overhead read systems, handheld read systems, read systems at a point of sale, and read systems at store exit points. The first host 30 may give the same or different weight to the data received from the various data sources S1-S6.

The data transmitted to the first host 30 from the downstream hosts and/or from its own associated RFID reader (in the arrangement of FIG. 5 or in any other inventory management system/method according to the present disclosure) may include the number of reads of a given RFID-readable tag, the power at which a given RFID-readable tag was read, backscatter of a given RFID-readable tag, and the position of a given RFID-readable tag in the environment being monitored. The data may also include the frequency at which read parameters occur (particularly for an RFID reader system with an adjustable frequency), read parameters versus antenna (for an RFID reader system with multiple antennas, such as a tunnel), operating power at which read parameters were achieved, and two- or three-dimensional location at which read parameters occur (particularly with scanning or multiple-antenna systems). Other types of data may also and/or alternatively be employed in generating instructions without departing from the scope of the present disclosure.

One or more of the preceding (or other information) may be factors used as input for the algorithm 28, which may generate instructions that may be directed to a group of RFID-readable tags or an individual RFID-readable tag needing special treatment to increase its readability. Instructions issued to the host of a downstream RFID reader system (in the arrangement of FIG. 5 or in any other inventory management system/method according to the present disclosure) may include, for example, modifications to (as applicable) the frequency at which the associated RFID reader operates, the power at which the associated RFID reader operates, the direction at which to orient an antenna of the associated RFID reader, the bounds of the environment being monitored by the RFID reader, and/or the number of times which the associated RFID reader attempts to communicate with a given RFID-readable tag. The instructions may include other and/or additional modifications without departing from the scope of the present disclosure.

Figure 6:
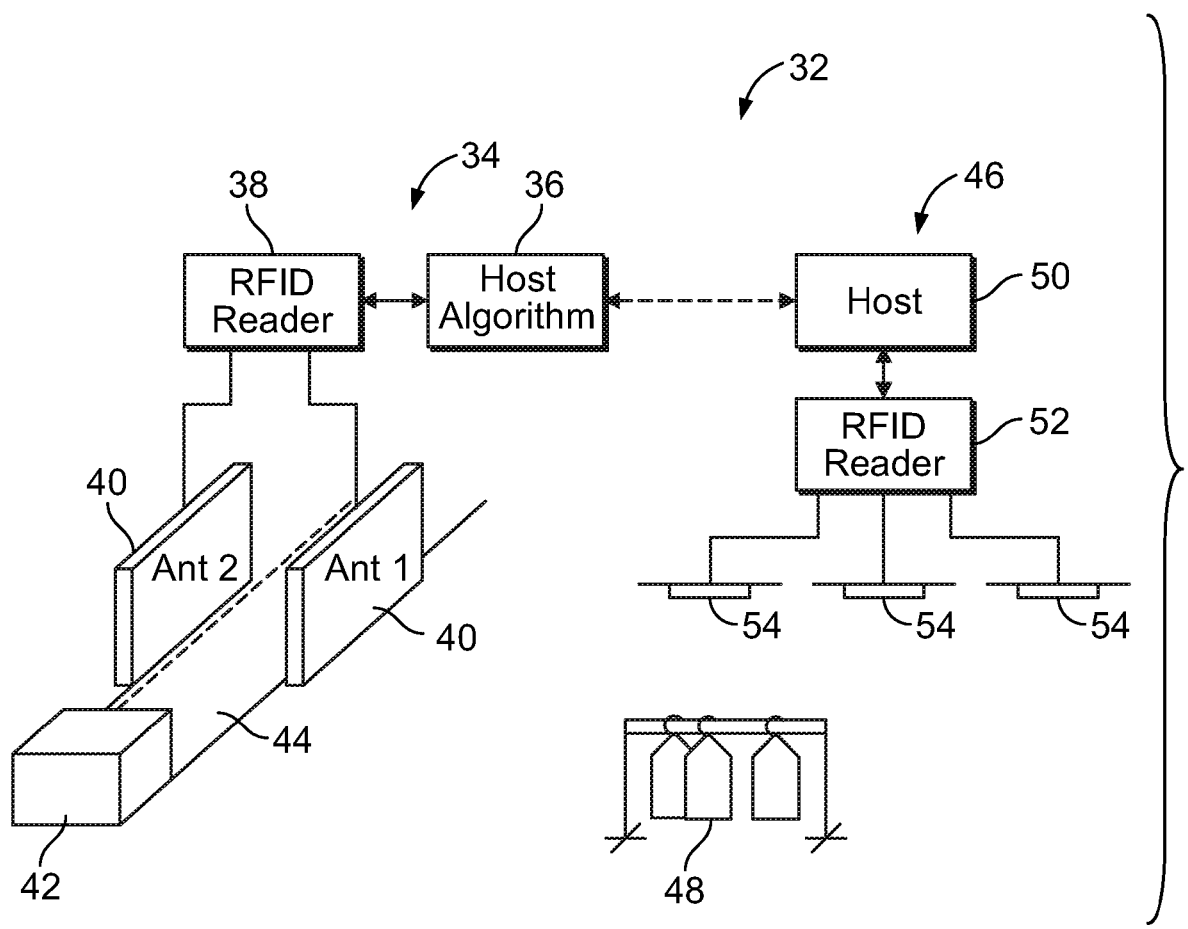
FIG. 6 is a schematic diagram of an inventory management system according to the present disclosure, having an overhead RFID reader system.

FIG. 6 illustrates an exemplary inventory management system according to the present disclosure, as indicated generally at 32. In the embodiment of FIG. 6, a first RFID reader system (indicated generally at 34) includes a first host 36 and a first RFID reader 38, with the first RFID reader 38 shown as including a pair of antennas 40 used to communicate with RFID-readable tags in a container 42 moving along a conveyor 44. The conveyor 44 or a portion thereof is, thus, the environment being monitored by the first RFID reader system 34. As described above, the RFID reader 38 generates a data set related to each RFID-readable tag with which it successfully communicates, which may include optimum antenna, frequency, number of reads overall, backscatter, position along the conveyor 44, etc. in a matrix. The data is processed by the first host 36, which applies an algorithm to generate an instruction set for a second RFID reader system (indicated generally at 46).

The second RFID reader system 46 is illustrated as an overhead RFID reader system, which monitors an environment comprising all or a portion of a retail floor space in which a plurality of RFID-readable tags are associated with merchandise 48 on display for customer consideration and purchase. The second RFID reader system 46 includes a second host 50 and a second RFID reader 52, which is shown as including a plurality of antennas 54. The second host 50 receives the instructions from the first host 36 by any suitable communication format, which may comprise a local connection (e.g., when the first environment is located in a back room of a store, while the second environment is located in a front room of the same store) or a long-range connection via the Internet or the like (e.g., when the two environments are not co-located, which may include being located in different countries). The second host 50 uses the instructions from the first host 36 to modify the operation of the second RFID reader 52 in attempting to communicate with the RFID-readable tags in its environment, with the intention being for the instructions to increase the number of RFID-readable tags that the second RFID reader 52 is able to successfully communicate with, per the principles described herein.

Figure 7:
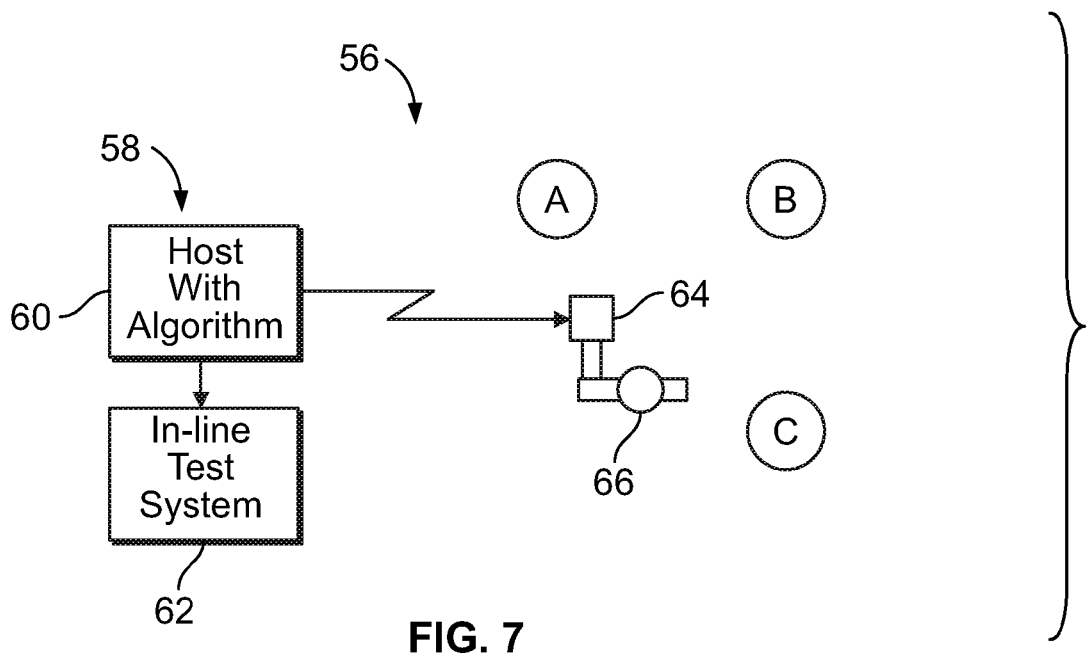
FIG. 7 is a schematic diagram of an inventory management system according to the present disclosure, having a handheld RFID reader system.

FIG. 7 illustrates another exemplary embodiment of an inventory management system according to the present disclosure, as indicated generally at 56. In the embodiment of FIG. 7, a first RFID reader system (indicated generally at 58) includes a first host 60 and a first RFID reader 62, with the first RFID reader 62 configured as an in-line test system, which attempts to communicate with a plurality of RFID-readable tags as part of a manufacturing test. As described above, the RFID reader 62 generates a data set related to each RFID-readable tag with which it successfully communicates, with the data being processed by the first host 60 to generate an instruction set for a second RFID reader system 64.

The second RFID reader system 64 is illustrated as a handheld RFID reader system. The second RFID reader system 64 includes a second host and a second RFID reader incorporated into a handheld device, which may be carried by an operator 66 (e.g., a store employee) to monitor an environment. In the illustrated embodiment, the handheld device is used to monitor all or a portion of a retail floor space in which a plurality of RFID-readable tags are associated with merchandise "A," "B," and "C" on display for customer consideration and purchase.

The second host receives the instructions from the first host 58 and uses the instructions from the first host 58 to modify the operation of the second RFID reader in attempting to communicate with the RFID-readable tags in its environment, with the intention being for the instructions to increase the number of RFID-readable tags that the second RFID reader is able to successfully communicate with, per the principles described herein. As the operator 66 will typically know where the merchandise "A," "B," and "C" and, hence, the associated RFID-readable tags are located within the environment, they can typically be relied upon to find and read each RFID-readable tag present in the environment, but modifications to the operation of the second RFID reader may complement the efforts of the operator. For example, the instructions may modify the operation of the second RFID reader to recognize when it is communicating with RFID-readable tags associated with the same product types as an RFID-readable tag needing special treatment. Recognizing that it is in the vicinity of a hard-to-read tag, the operation of the second RFID reader may then be further modified in accordance with the instructions associated with that particular RFID-readable tag so as to increase the likelihood of successfully communicating with it.

The performance of an inventory management system/method according to the present disclosure may be optimized or at least improved by considering all of the parameters measured by the first RFID reader system with respect to all possible settings for the downstream RFID reader systems, looking for correlations. Running multiple settings on, for example, the overhead system of FIG. 6 to gather data is based on an initial starting point, with the correlation runs typically being carried out in "dead time," such as overnight when the store is closed. The correlation results can adapt the algorithm employed by the first host, as well as changing the data that is gathered by the first RFID reader system. For example, if backscatter from an RFID-readable tag measured by the first RFID reader system is shown to be weakly related to the quality of the performance of the downstream RFID reader systems and the measurement of backscatter by the first RFID reader system takes additional time, then the first RFID reader system may cease further collection of backscatter data.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An inventory management system comprising:
a first RFID reader system including
    a first RFID reader configured to attempt to communicate with a plurality of RFID-readable tags and generate data regarding the RFID-readable tags with which the first RFID reader has successfully communicated, and
    a first host programmed to receive said data from the first RFID reader, generate instructions based at least in part on said data, and transmit said instructions; and
a second RFID reader system including
    a second RFID reader configured to attempt to communicate with said plurality of RFID-readable tags, and
    a second host programmed to receive said instructions from the first host and modify the operation of the second RFID reader in attempting to communicate with said plurality of RFID-readable tags based at least in part on said instructions so as to increase the number of said plurality of RFID-readable tags which the second RFID reader successfully communicates in a given time.

2. The inventory management system of claim 1, wherein said instructions modify the operation of the second RFID reader so as to increase the number of times the second RFID reader system attempts to communicate with at least one of said plurality of RFID-readable tags.

3. The inventory management system of claim 1, wherein the second host is further programmed to
    assess the operation of the second RFID reader in attempting to communicate with said plurality of RFID-readable tags,
    generate second data based at least in part on the assessment of the operation of the second RFID reader in attempting to communicate with said plurality of RFID-readable tags, and
    transmit said second data to the first host, wherein subsequent instructions generated by the first host and transmitted to the second host are based at least in part on said second data to further modify the operation of the second RFID reader in subsequent attempts to communicate with said plurality of RFID-readable tags.

4. The inventory management system of claim 3, wherein the second host is further programmed to
    assess the operation of the second RFID reader in attempting to communicate with said plurality of RFID-readable tags by assessing whether an objective has been met, and
    transmit said second data to the first host only if the objective has not been met.

5. The inventory management system of claim 3, further comprising a third RFID reader system including
    a third RFID reader configured to attempt to communicate with said plurality of RFID-readable tags, and
    a third host programmed to
    receive said instructions from the first host and modify the operation of the third RFID reader in attempting to communicate with said plurality of RFID-readable tags,
    assess the operation of the third RFID reader in attempting to communicate with said plurality of RFID-readable tags,
    generate third data based at least in part on the assessment of the operation of the third RFID reader in attempting to communicate with said plurality of RFID-readable tags, and
    transmit said third data to the first host, wherein subsequent instructions generated by the first host and transmitted to the second and third hosts are based at least in part on said second and third data to further modify the operation of the second and third RFID readers in subsequent attempts to communicate with said plurality of RFID-readable tags.

6. The inventory management system of claim 5, wherein said subsequent instructions are based more on one of the second and third data than the other one of said second and third data.

7. The inventory management system of claim 3, further comprising a third RFID reader system including
a third RFID reader configured to attempt to communicate with said plurality of RFID-readable tags, and
a third host associated with the third RFID reader, wherein said subsequent instructions generated by the first host are transmitted to the third host to modify the operation of the third RFID reader in attempting to communicate with said plurality of RFID-readable tags, and
the attempts by the second and third RFID readers to communicate with said plurality of RFID-readable tags are sequential.

8. The inventory management system of claim 3, further comprising a third RFID reader system including
a third RFID reader configured to attempt to communicate with said plurality of RFID-readable tags, and
a third host associated with the third RFID reader, wherein the first host is configured to generate second instructions and to transmit said second instructions to the third host to modify the operation of the third RFID reader in attempting to communicate with said plurality of RFID-readable tags, and
said instructions and said second instructions are different.

9. A method of managing inventory, comprising:
providing a plurality of RFID-readable tags;
operating a first RFID reader to attempt to communicate with said plurality of RFID-readable tags;
generating data regarding the RFID-readable tags successfully communicated with by the first RFID reader;
generating instructions based at least in part on said data;
operating a second RFID reader to attempt to communicate with said plurality of RFID-readable tags, wherein the operation of the second RFID reader in attempting to communicate with said plurality of RFID-readable tags is modified based at least in part on said instructions, said instructions modifying the operation of the second RFID reader so as to increase the number of said plurality of RFID-readable tags with which the second RFID reader successfully communicates in a given time.

10. The method of claim 9, wherein said instructions modify the operation of the second RFID reader so as to increase the number of times the second RFID reader system attempts to communicate with at least one of said plurality of RFID-readable tags.

11. The method of claim 9, further comprising
assessing the operation of the second RFID reader in attempting to communicate with said plurality of RFID-readable tags,
generating second data based at least in part on the assessment of the operation of the second RFID reader in attempting to communicate with said plurality of RFID-readable tags, and
incorporating said second data into the generation of subsequent instructions to further modify the operation of the second RFID reader in subsequent attempts to communicate with said plurality of RFID-readable tags.

12. The method of claim 11, further comprising
assessing the operation of the second RFID reader in attempting to communicate with said plurality of RFID-readable tags by assessing whether an objective has been met, and
generating said second data only if the objective has not been met.

13. The method of claim 11, further comprising
operating a third RFID reader to attempt to communicate with said plurality of RFID-readable tags, wherein the operation of the third RFID reader in attempting to communicate with said plurality of RFID-readable tags is modified based at least in part on said instructions,
assessing the operation of the third RFID reader in attempting to communicate with said plurality of RFID-readable tags,
generating third data based at least in part on the assessment of the operation of the third RFID reader in attempting to communicate with said plurality of RFID-readable tags, and
incorporating said third data into the generation of subsequent instructions to further modify the operation of the second and third RFID readers in subsequent attempts to communicate with said plurality of RFID-readable tags.

14. The method of claim 13, wherein said subsequent instructions are based more on one of the second and third data than the other one of said second and third data.

15. The method of claim 11, further comprising operating a third RFID reader to attempt to communicate with said plurality of RFID-readable tags, wherein
the operation of the third RFID reader in attempting to communicate with said plurality of RFID-readable tags is modified based at least in part on said subsequent instructions, and
the attempts by the second and third RFID readers to communicate with said plurality of RFID-readable tags are sequential.

16. The method of claim 11, further comprising
providing a third RFID reader configured to attempt to communicate with said plurality of RFID-readable tags,
generating second instructions to modify the operation of the third RFID reader in attempting to communicate with said plurality of RFID-readable tags, wherein said instructions and said second instructions are different.

* * * * *